United States Patent [19]

Shu

[11] Patent Number: 4,984,097
[45] Date of Patent: Jan. 8, 1991

[54] HALFTONE REPRODUCTION WITH ENHANCED GRAY LEVEL REPRODUCIBILITY

[75] Inventor: Joseph S. Shu, White Plains, N.Y.
[73] Assignee: Nynex Corporation, New York, N.Y.
[21] Appl. No.: 304,428
[22] Filed: Jan. 31, 1989
[51] Int. Cl.$^5$ .............................................. H04N 1/40
[52] U.S. Cl. .................................... 358/429; 358/448; 358/455
[58] Field of Search ............... 358/429, 455, 456, 458, 358/459, 465, 466, 454, 448

[56] References Cited

U.S. PATENT DOCUMENTS

| | | | |
|---|---|---|---|
| 4,633,327 | 12/1986 | Roetling | 358/456 |
| 4,800,442 | 1/1989 | Riseman et al. | 358/459 |
| 4,847,695 | 7/1989 | Arai | 358/455 |
| 4,897,734 | 1/1990 | Sato et al. | 358/456 |

FOREIGN PATENT DOCUMENTS 2157119A 10/1985 United Kingdom .

Primary Examiner—Edward L. Coles, Sr.
Assistant Examiner—Jerome Grant
Attorney, Agent, or Firm—Douglas Kirk; John J. Torrente

[57] ABSTRACT

A practice for producing a halftone reproduction wherein a predetermined screen function is used to process the gray levels of the scanned original and wherein the halftone reproduction is made capable of exhibiting gray levels over the entire gray tone range of 0 (black) to 255 (white) by selecting the screen frequency in the screen direction so as to result in a screen frequency in the print direction which is other than a sub-multiple of the print frequency.

30 Claims, 3 Drawing Sheets

SCREEN FREQUENCY (dpi)
(Scan/print frequency = 300 dpi)

HALFTONE REPRODUCTION WITH ENHANCED GRAY LEVEL REPRODUCIBILITY

BACKGROUND OF THE INVENTION

This invention relates to halftone reproduction of a continuous tone original and, in particular, to a method and system for enhancing the number of gray levels of the original which are reproducible in the halftone reproduction.

Techniques for developing halftone reproductions of continuous tone originals are known in the art. In these techniques, the halftone original is formed from halftone dots of typically equal spacing whose size is varied to realize the various gray levels of the original.

In one technique for achieving a halftone reproduction, a screening process is used. In usual screening processes, gray level values of a periodic screen function (e.g., a repetitive triangle function) are added to the gray level values of the corresponding scanned elements (i.e. "pixels") of an original. Each sum value is then compared to a threshold value and a 0 (black) gray level value or a 255 (white) gray level value is generated depending upon the comparison. The resultant digital gray level values are then used to control a printer which darkens pixels in the reproduction corresponding to the 0 gray level values and leaves blank or white pixels corresponding to the 255 gray level values. The combined effect of these black and white reproduction pixels results in the halftone reproduction.

In present day practices, the screening process is often done electronically. U.S. Pat. No. 4,633,327 discloses one such electronic screening practice in which a sinusoidal screen function is employed. In this case, the threshold value used is adjusted so that over each period of the screen function the average value of the generated digital gray values equals the average value of the scanned pixel gray values. In this practice, the screen function is also adjusted in each screen period in dependence on the contrast of the pixel gray level values.

While the screening practice of the '327 patent and the screening practices of the other prior art systems provide adequate halftone reproductions, they are somewhat limited in the number of gray levels of the original which can be satisfactorily reproduced. As a result, there still remains a need for a halftone screening practice which can reproduce a larger number of gray levels of an original.

It is, therefore, a primary object of the present invention to provide a practice for developing a halftone reproduction which is capable of exhibiting a greater number of gray levels of the original.

It is a further object of the present invention to provide a halftone screening practice which enables the development of halftone reproductions capable of exhibiting gray levels over substantially the entire gray level range of 0 (black) to 255 (white).

SUMMARY OF THE INVENTION

In accordance with the principles of the present invention, the above and other objectives are realized by utilizing a periodic screen function which extends over all the scanned pixels of the original and whose frequency in the screen direction is selected such as to result in a frequency of the screen function in the print direction which is other than an integer sub-multiple of the print frequency. In the practice of the invention, the gray level values of the screen function at the scanned pixel positions are compared to the gray level values of the pixels, the latter serving as threshold values. This comparison results in the generation of a corresponding set of binary gray level values, each corresponding to either a first or 0 grey level value (black) or a second or 255 gray level value (white). The set of binary gray level values is then used to address a printer operating in the print direction at the print frequency. The printer, in response to these signals, provides reproduction pixels at the print frequency which are either black (darkened) or white (not darkened) depending on the binary signals. These reproduction pixels, in turn, combine to produce the halftone reproduction.

In the embodiment of the invention to be disclosed hereinafter two preferable screen functions are used. One screen function is a triangle function and the other a sinusoidal function.

Additionally, in a further aspect of the invention, the screening practice of the invention is carried out using scan and screen frequencies having a ratio in the range of 6 to 13. This has been found to improve image quality.

Brief Description of the Drawings

The above and other features and aspects of the present invention will become more apparent upon reading the following detailed description in conjunction with the accompanying drawings, in which.

DETAILED DESCRIPTION

Figure 1:
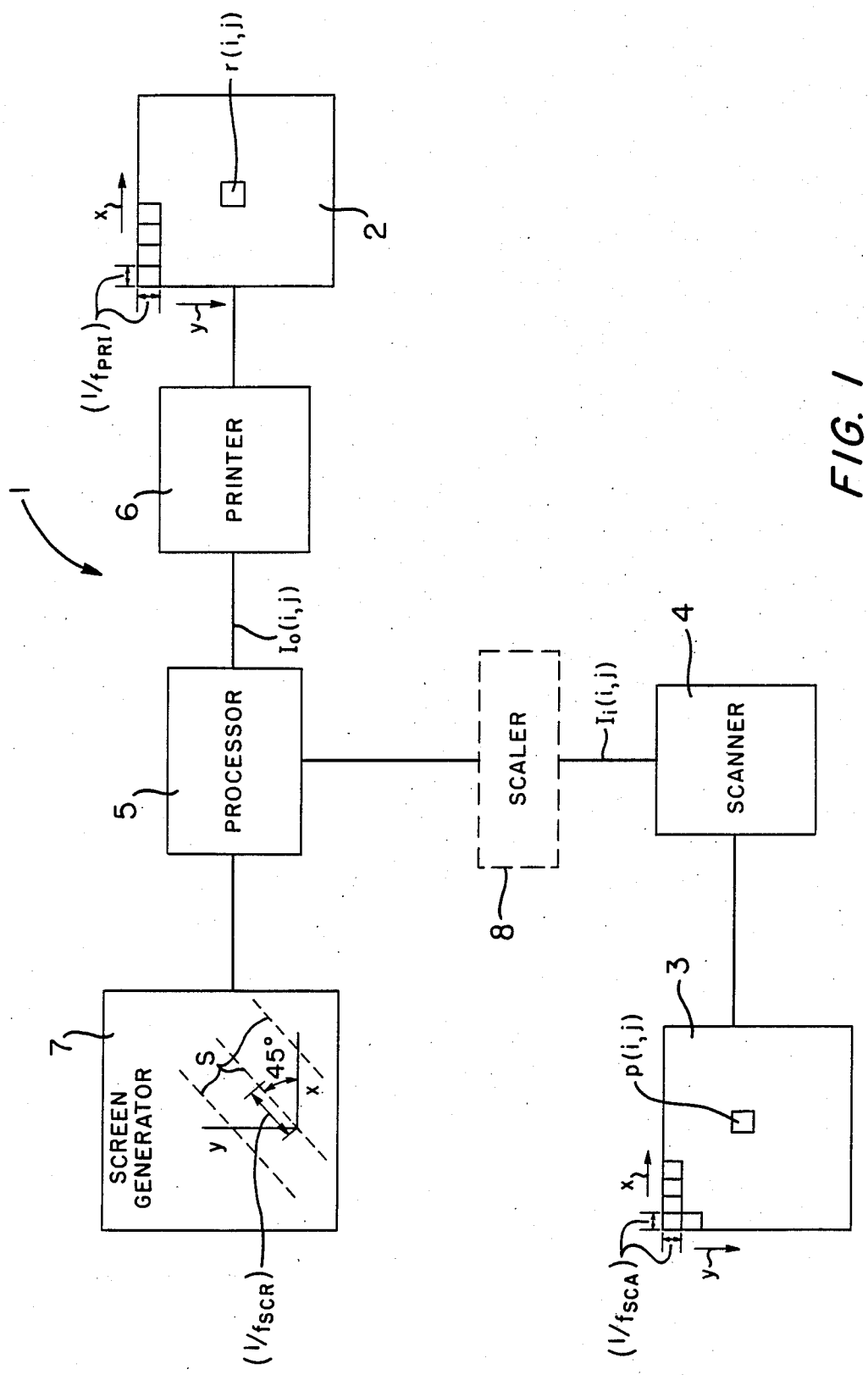
FIG. 1 shows a system for providing a halftone reproduction of an original in accordance with the principles of the present invention.

FIG. 1 shows a system 1 for generating a halftone reproduction 2 of an original 3 in accordance with the principles of the present invention. The original 3 is assumed to be a continuous tone original capable of having gray levels over the entire gray scale range of 0 (black) to 255 (white). As a result, to reproduce the gray levels of the original 3 in the reproduction 2, the system 1 must be capable of generating halftone dots in the reproduction whose size can be varied to accomodate the 0–255 range of gray levels of the original. This is accomplished, in accordance with the invention, by processing the original 3 with a preselected screen function as will be described more fully hereinbelow.

In FIG. 1, the original 3 is illustrated as having extent in the orthogonal x and y directions. A scanner 4 digitally scans in these directions elemental adjacent areas or pixels of the original. This scanning is at defined spacial scanning frequency $f_{SCA}$ in pixels per unit lenth in the two directions. The pixels in the original 3 can thus be represented by the function p(i,j), where i and j are integers which define the x,y pixel positions in terms of the following expressions: $x=i/f_{SCA}$ and $y=j/f_{SCA}$.

At each of the scanned pixels p(i,j), the scanner 4 develops a digital signal $I_t(i,j)$ corresponding to the gray level value of the pixel. The digital signals $I_t(i,j)$ are typically 8 bit signals and, therefore, are capable of representing gray level values over the entire gray level range of 0 to 255.

The signals $I_i(i,j)$ are coupled to a processing unit 5 which, as will be explained below, generates for each signal $I_i(i,j)$ a corresponding binary signal $I_o(i,j)$ which is indicative of either a 0 or 255 gray level value. The binary signals $I_o(i,j)$, in turn, address a printer 6 which prints in the x and y directions at a spatial print frequency $f_{PRI}$ in pixels per unit length, reproduction pixels $r(i,j)$ corresponding to the binary signals $I_o(i,j)$.

In the present case, the printer 6 darkens or leaves blank or white each reproduction pixel $r(i,j)$ in dependence on the gray level value of the associated binary signal. In particular, each binary signal with a gray level of 255 results in a pixel $r(i,j)$ which is left white, while each binary signal with a gray level of 0 results in a reproduction pixel which is darkened.

Operation of the printer 6 thereby results in black and white reproduction pixels $r(i,j)$ which together produce the halftone dots for the reproduction 2. As indicated above, as a result of the processing carried out in processor 5, the resultant size of these halftone dots can be controlled so as to successfully reproduce gray levels of the original 3 over the entire gray level range of 0 to 255.

More particularly, in accordance with the invention, the processing of the digital grey level signals $I_i(i,j)$ in the processor 5 is accomplished utilizing a preselected screen function S generated by a screen generator 7. The screen function S is a periodic mathematical function which is applicable over the entire pixel area of the original 3 and whose spatial frequency $f_{SCR}$ in the screen direction is selected such as to result in a spatial frequency $f'_{SCR}$ of the screen function in the x and y print directions which is other than an integer sub-multiple of the print frequency $f_{PRI}$. In the present case, as shown in FIG. 1, the screen direction is at the usual 45° angle to the x and y directions, so that the screen frequency in these directions is given as $f'_{SCR} = f_{SCR}/\sqrt{2}$.

In the processor 5, the gray level signal values $I_i(i,j)$ developed by the scanner 4 are used as threshold values and compared to the corresponding gray level screen values $S(i,j)$ at the positions of the corresponding pixels $p(i,j)$. If the screen value $S(i,j)$ is equal to or exceeds the value $I_i(i,j)$, then the resultant binary signal developed $I_o(i,j)$ will be indicative of a 0 gray level. On the other hand, if the screen value is less than the corresponding value $I_i(i,j)$, then the resultant binary signal $I_o(i,j)$ will be indicative of a 255 gray level. In this way, a binary signal $I_o(i,j)$ is generated for each reproduction pixel $r(i,j)$ corresponding to each input grey level value $I_i(i,j)$ and corresponding pixel $p(i,j)$ of the original.

With the selection of the screening function S as above-described and with the use of the values $I_i(i,j)$ as threshold values, the binary signals $I_o(i,j)$ produced will result in reproduction pixels $r(i,j)$ which combine to form halftone dots at the screen frequency $f_{SCR}$ whose size varies depending upon the gray level of the original. In particular, the size variation of the halftone dots will be such as to accomodate a range of gray levels of the original from 0 to 255.

In accordance with the invention, two preferable screen functions have been developed. One screen function is a periodic triangle function $S_T$ and the other a sinusoidal function $S_S$. The former function results in a linear transformation of gray levels of the original 3 to the reproduction 2, while the latter results in a non-linear transformation. The non-linear transformation, in turn, provides enhancement of the highlight and shadow contrasts of the resultant halftone reproduction 2.

The triangle screen function $S_T$ as a function of the pixel positions $(i,j)$ is given by the following equations:

$$S_T(i,j) = 255/2[F(k=i) \cdot F(k=j) + 1] \quad (1)$$

where $$F(k) = 1 - 4r \cdot f'_{SCR} \text{ for } r \leq \tfrac{1}{2} f'_{SCR} \quad (2)$$

$$F(k) = 4r \cdot f'_{SCR} - 3 \text{ for } r > \tfrac{1}{2} f'_{SCR} \quad (3)$$

and $$r = (k - k_1/f'_{SCR})/f_{SCA} \quad (4)$$

$$k_1 = \text{truncation of } \frac{k f'_{SCR}}{f_{SCA}} \quad (5)$$

$$k \text{ and } k_1 \text{ are integers} \quad (6)$$

The sinusoidal screen function, in turn, is given as $$S_s(i,j) = 255/2[\cos(2\pi i\, f'_{SCR}/f_{SCA}) \cdot \cos(2\pi j\, f'_{SCR}/f_{SCA}) + 1] \quad (7)$$

Figure 2:
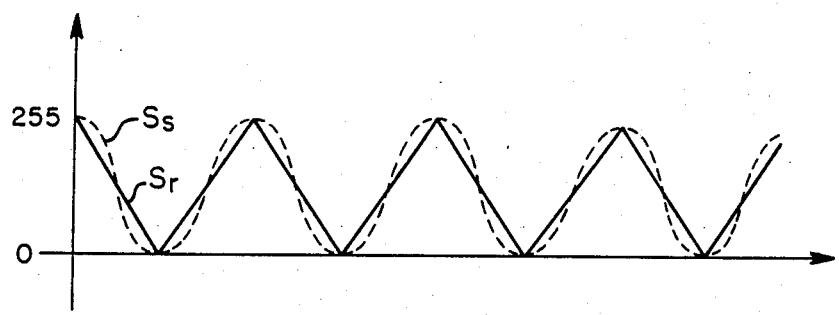
FIG. 2 shows screening functions usable with the system of FIG. 1.
Figure 4:
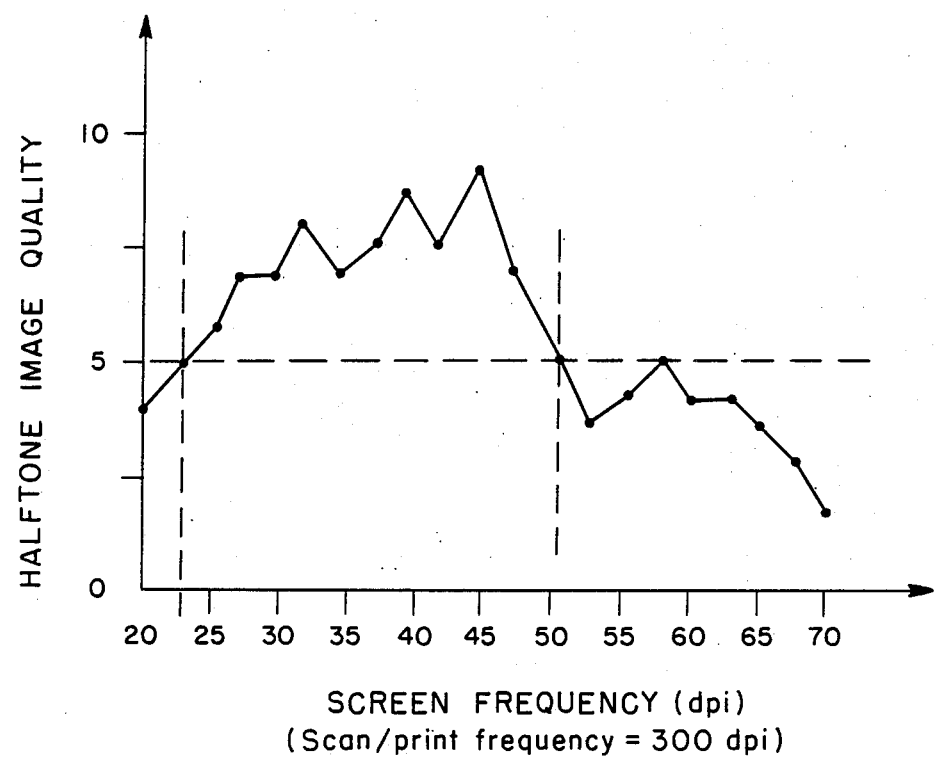
FIG. 4 shows a representative graph of image quality as a function of scan and screen frequencies.

FIG. 2 illustrates the above screen functions of equations (1) and (7) in one dimension. The triangle function is shown in solid line and the sinusoidal function in dotted line. As above-noted, with these screen functions, the reproduction 2 can exhibit halftone dots of 255 different sizes so as to duplicate grey tones in the original 3 over the entire gray scale range of 0 to 255.

Figure 3A:
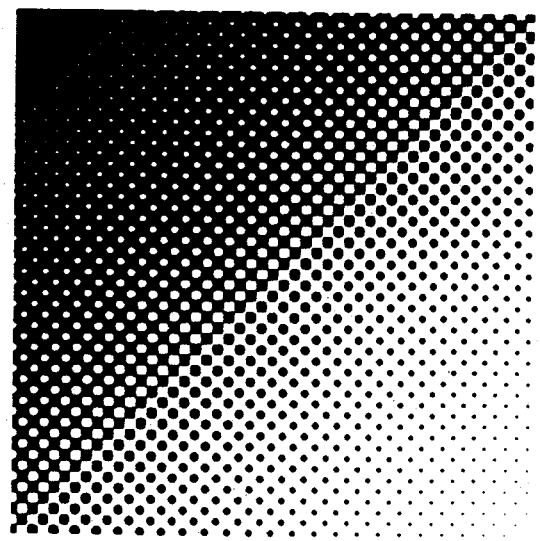
FIGS. 3A and 3B show halftone reproductions realized using the screening functions of FIG. 2.
Figure 3B:
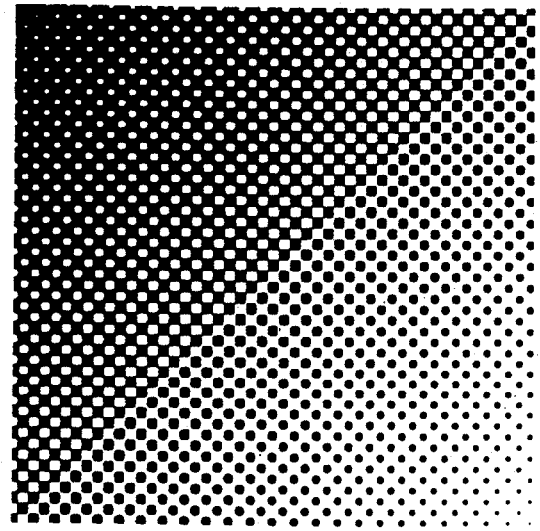

FIGS. 3(A) and 3(B) show halftone reproductions obtained utilizing the screen functions of equations (1) and (7), respectively. In both these cases, the original was simulated by computer generation and comprised a continuous-tone image in which the gray levels changed smoothly from 0 to 255 from the upper left corner to the lower bottom corner of the image. As can be seen, the processing method of the invention has converted the original gray tones into corresponding sizes of halftone dots which give the appearance and correspond to these original tones. In the examples of FIGS. 3(A) and 3(B), the screen direction was at 45° to the x,y scan and print directions. Furthermore, the screen frequency in the screen direction was 10 dots per inch and the scan/print frequencies were 300 dots or pixels per inch.

In the discussion of the system 1 above, it was assumed that the scan frequency $f_{SCA}$ of the scanner 4 and the print frequency $f_{PRI}$ of the printer 6 were at the same frequency. This is required to ensure that the reproduction 2 will be of the same size as the original 3. To accomodate for different frequencies between the scanner and printer and still achieve a reproduction having the same size as the original, a scaler 8 can be disposed between the scanner 4 and processor 5. The scaler 8 can be a conventional bilinear interpolator or a conventional cubic spline interpolator. The scaler 8 functions to adjust the digital gray level signals $I_i(i,j)$ by adding or subtracting signals so that the scanning operation is made to appear to have occurred at the same frequency as the printing operation. With the interpolator 7, the scan frequency of the scanner 4 advantageously can be made smaller than the print frequency, without causing a change in size in going from original to reproduction.

In a further aspect of the invention, it has been found that the quality of the resultant reproduction developed with the processing practice of the invention can be enhanced by controlling the ratio of the scan or print frequency (assumed to be equal) to the screen frequency $f_{SCR}$. FIG. 5 shows a representative graph of image quality for reproductions produced in accordance with the invention for various values of screen frequency at a given value of scan/print frequency. As can be seen, for ratios of there frequencies between about 6 and 13 acceptable quality is realized. Thus, this range represents a preferable range for the screening practice of the invention.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A method for use in developing a halftone reproduction of a continuous tone original, the original being scanned at a spatial frequency $f_{SCA}$ in a given scan direction to define pixels of the original at discrete first positions of the original and the halftone reproduction being produced by a printer which prints at a spatial frequency $f_{PRI}$ in a given print direction to produce reproduction pixels which together form halftone dots at a spatial frequency $f_{SCR}$ in a given screen direction and which are capable of exhibiting gray levels over substantially the entire gray level range of 0 (black) to 255 (white), the method comprising:

providing the gray level values of the pixels at the discrete first positions to define first gray level values, defining a gray level screen function applicable over the pixels of the original, the screen function having said frequency $f_{SCR}$ in said screen direction and said frequency $f_{SCR}$ being selected such that the frequency $f'_{SCR}$ of the screen function in the print direction is other than a sub-multiple of the print frequency $f_{PRI}$;

determining the values of the gray level screen function at the discrete first positions only to form second gray level values; and for each first gray level value which is equal to or less than the second gray level value at the same discrete first position establishing a third gray level value, and for each first gray level value which is greater than the second gray level value at the same discrete first position establishing a fourth gray level value.

2. A method in accordance with claim 1 further comprising:

utilizing the established third and fourth gray level values to develop the halftone reproduction.

3. A method in accordance with claim 2 wherein:

and said step of utilizing includes darkening each reproduction pixel corresponding to each established third gray level value and leaving blank each reproduction pixel corresponding to each established fourth gray level value.

4. A method in accordance with claim 3 wherein:

said step of utilizing is carried out with a digital printer operating in said print direction at said print frequency $f_{PRI}$.

5. A method in accordance with claim 4 wherein:

said step of providing includes scanning said original with a digital scanner operating in said scan direction at said scan frequency $f_{SCA}$.

6. A method in accordance with claim 5 wherein:

said scan and print frequencies are equal.

7. A method in accordance with claim 5 wherein:

said scan and print frequencies are different;

and said method further includes performing an interpolation on said first gray level values so as to make it appear that said scan and print frequencies are equal.

8. A method in accordance with claim 1 wherein:

the gray level screen function is a triangle function.

9. A method in accordance with claim 8 wherein:

the scanned pixels are at positions (i,j) of an orthogonal coordinate system where i and j are integers;

and the gray level screen function S(i,j) is given by $$S(i,j) = 255/2 \ [F(k=i) \cdot F(k=j) + 1]$$

where $$F(k) = 1 - 4r \cdot f_{SCR} \text{ for } r \leq \tfrac{1}{2} f_{SCR}$$

$$F(k) = 4r \cdot f_{SCR} - 3 \text{ for } r > \tfrac{1}{2} f_{SCR}$$

and $$r = (k - k_1/f_{SCR})/f_{SCA}$$

$$k_1 = \text{truncation of } \frac{k f_{SCR}}{f_{SCA}}$$

k and $k_1$ are integers.

10. A method in accordance with claim 1 wherein:

the gray level screen function is sinusoidal.

11. A method in accordance with claim 10 wherein:

the pixels of the original are at positions (i,u) in an orthogonal coordinate system, where i and j are integers;

and the gray level screen function is given as $$S(i,j) = 255/2[\cos(2\pi i \ f_{SCR}/f_{SCA}) \cdot \cos(2\pi j \ f_{SCR}/f_{SCA}) + 1]$$

12. A method in accordance with claim 1 wherein:

the first gray level values are represented by digital signals;

and the gray level screen function is an electronic function.

13. A method in accordance with claim 12 wherein:

said established third and fourth gray level values are represented by binary signals.

14. A method in accordance with claim 13 wherein:

the ratio of $f_{SCA}$ to $f_{SCR}$ is in the range of 6 to 13.

15. A method in accordance with claim 1 wherein:

said third gray level value is 0 and said fourth gray level value is 255.

16. Apparatus for use in developing a halftone reproduction of a continuous tone original, the original being scanned at a spatial frequency $f_{SCA}$ in a given scan direction to define pixels of the original at discrete first positions of the original and the halftone reproduction being produced by a printer which prints at a spatial frequency $f_{PRI}$ in a given print direction to produce reproduction pixels which together form halftone dots at a spatial frequency $f_{SCR}$ in a given screen direction and which are capable of exhibiting gray levels over substantially the entire gray level range of 0 (black) to 255 (white), the apparatus comprising:

means for providing the gray level values of the pixels at the discrete first positions to define first gray level values;

means for defining a gray level screen function applicable over the pixels of the original, the screen function having said frequency $f_{SCR}$ in said screen direction and said frequency $f_{SCR}$ being selected such that the frequency $f'_{SCR}$ of the screen function in the print direction is other than a sub-multiple of the print frequency $f_{PRI}$;

means for determining the values of the gray level screen function at the discrete first positions only to form second gray level values; and means for establishing for each first gray level value which is equal to or less than the second gray level value at the same discrete first position a third gray level value, and for establishing for each first gray level value which is greater than the second gray level value at the same discrete first position a fourth gray level value.

17. Apparatus in accordance with claim 16, further comprising:
means for using the established third and fourth gray level values to develop the halftone reproduction.

18. Apparatus in accordance with claim 16, wherein:
and said means for using includes means for darkening each reproduction pixel corresponding to each established third gray level value and leaving blank each reproduction pixel corresponding to each established fourth gray level value.

19. Apparatus in accordance with claim 17 wherein:
said means for darkening comprises a digital printer operating in said print direction at said print frequency $f_{PRI}$.

20. Apparatus in accordance with claim 18 wherein:
said means for providing includes a digital scanner for scanning said original in said scan direction at said scan frequency $f_{SCA}$.

21. Apparatus in accordance with claim 19 wherein:
said scan and print frequencies are equal.

22. Apparatus in accordance with claim 19 wherein:
said scan and print frequencies are different;
and said apparatus further includes means for performing an interpolation on said first gray level values so as to make it appear that said scan and print frequencies are equal.

23. Apparatus in accordance with claim 16 wherein:
the gray level screen function is a triangle function.

24. Apparatus in accordance with claim 22 wherein:
the scanned pixels are at positions (i,j) of an orthogonal coordinate system where i and j are integers;
and the gray level screen function S(i,j) is given by $$S(i,j) = 255/2[F(k=i) \cdot F(k=j) + 1]$$

where $$F(k) = 1 - 4r \cdot f'_{SCR} \text{ for } r \leq \tfrac{1}{2} f'_{SCR}$$

$$F(k) = 4r \cdot f'_{SCR} - 3 \text{ for } r > \tfrac{1}{2} f'_{SCR}$$

and $$r = (k - k_1/f'_{SCR})/f'_{SCR})/f_{SCA}$$

$$k_1 = \text{truncation of } \frac{k f'_{SCR}}{f_{SCA}}$$

k and $k_1$ are integers.

25. Apparatus in accordance with claim 16 wherein:
the gray level screen function is sinusoidal.

26. Apparatus in accordance with claim 24 wherein:
the pixels of the original are at positions (i,j) in an orthogonal coordinate system, where i and j are integers;
and the gray level screen function S(i,j) is given as $$S(i,j) = 255/2[\cos(2\pi i f'_{SCR}/f_{SCA}) \cdot \cos(2\pi j f'_{SCR}/f_{SCA}) + 1]$$

27. Apparatus in accordance with claim 16 wherein:
the first gray level values are represented by digital signals;
and the gray level screen function is an electronic function.

28. Apparatus in accordance with claim 27 wherein:
said established third and fourth gray level values are represented by binary signals.

29. Apparatus in accordance with claim 16 wherein:
the ratio of $f_{SCA}$ to $f_{SCR}$ is in the range of 6 to 13.

30. Apparatus in accordance with claim 16 wherein:
said third gray level value is 0 and said fourth gray level is 255.

* * * * *